May 20, 1924.
H. K. SANDELL
MOTION PICTURE CAMERA
Filed Aug. 10, 1921
1,494,810
5 Sheets-Sheet 1
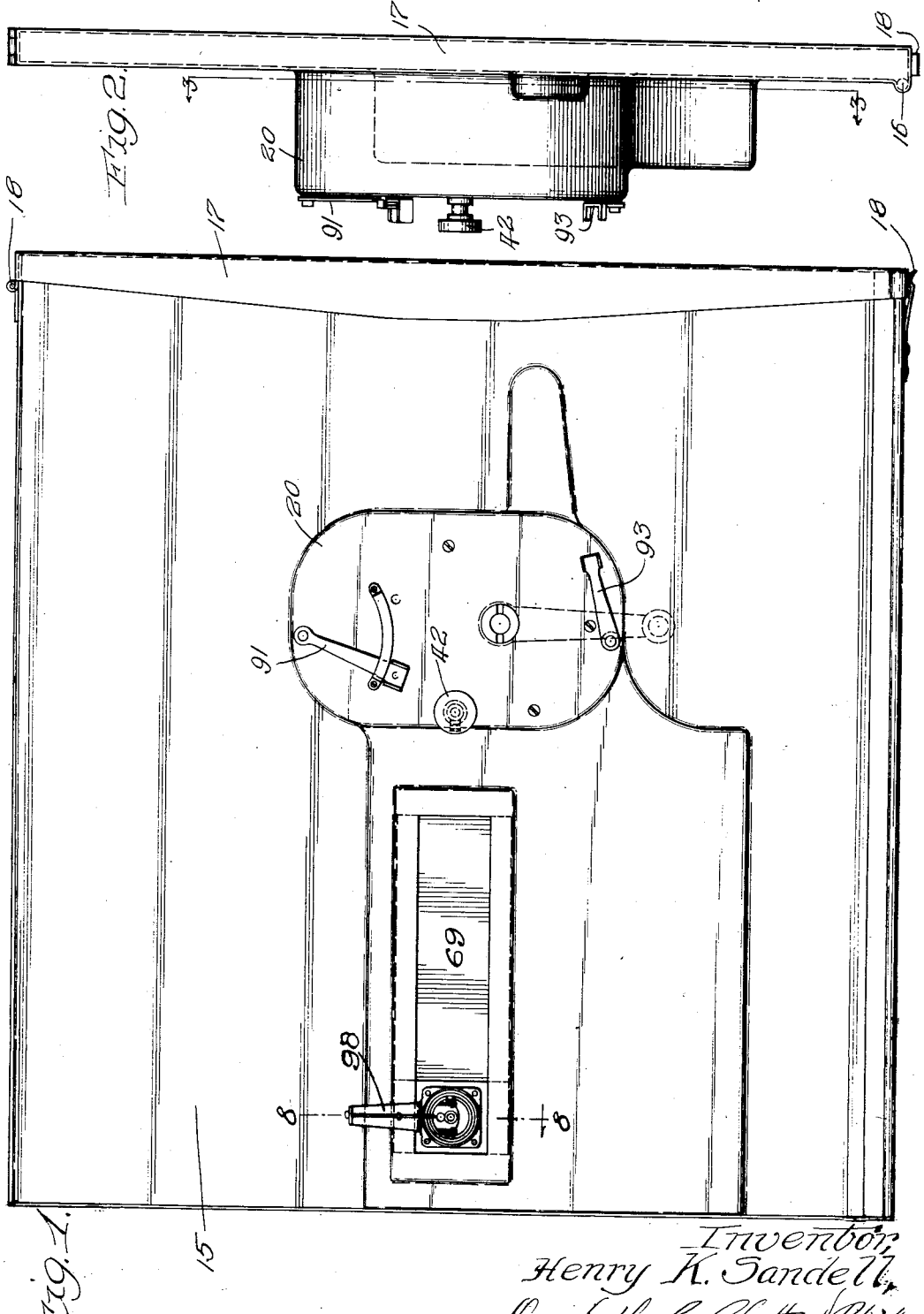
Inventor,
Henry K. Sandell,
By Dyrenforth, Lee, Chritton & Wiles,
Attys.

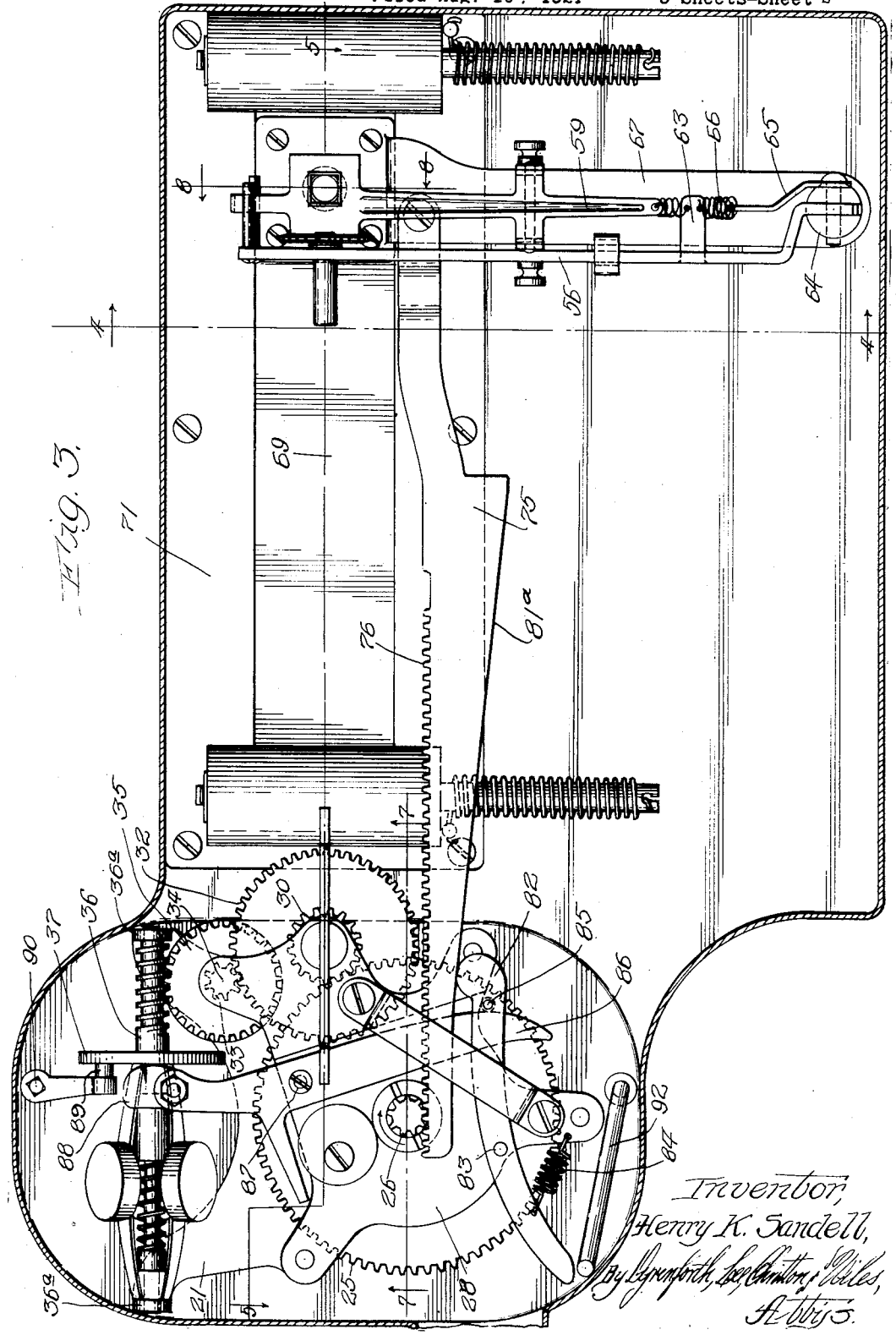

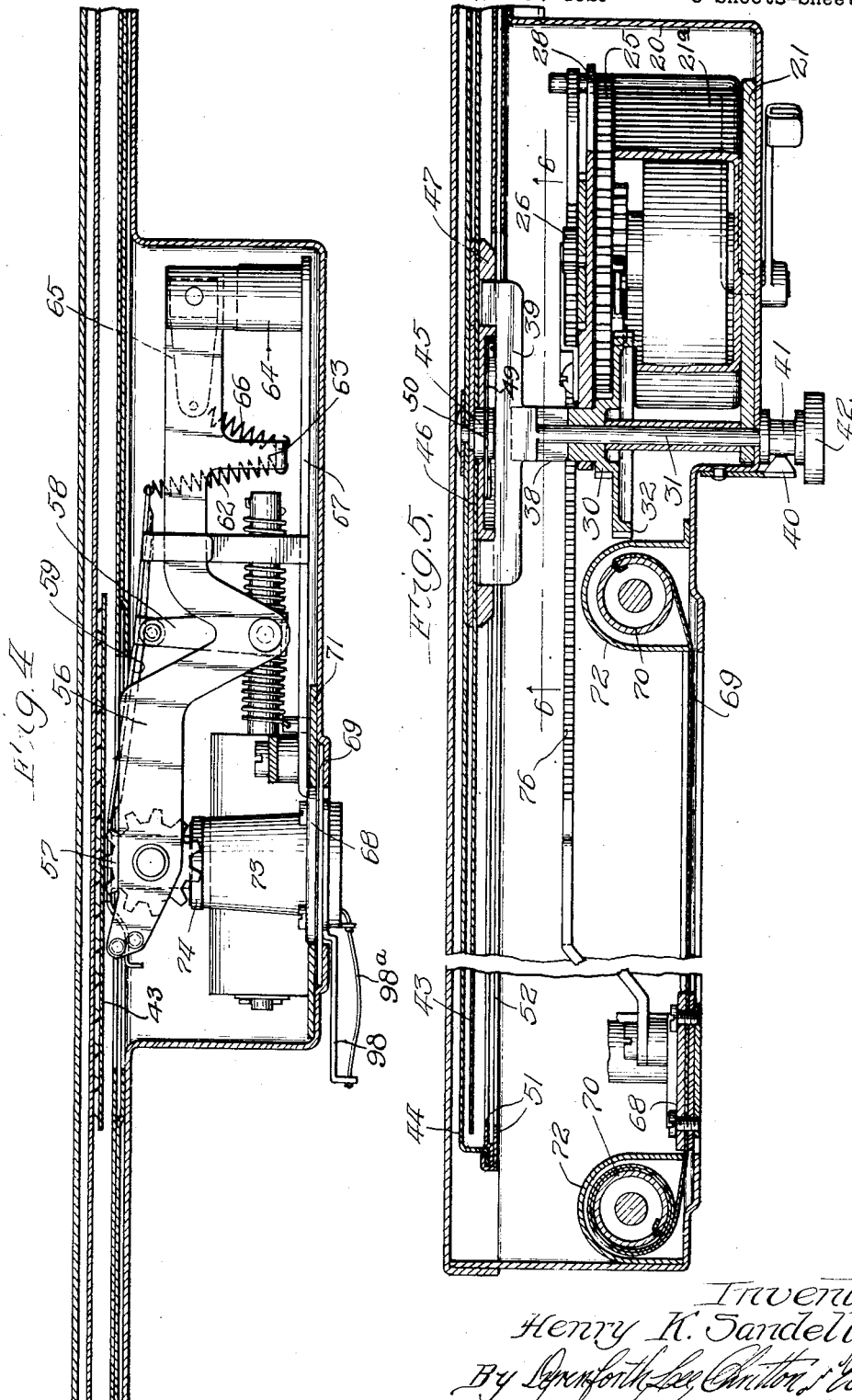

May 20, 1924.
H. K. SANDELL
1,494,810
MOTION PICTURE CAMERA
Filed Aug. 10, 1921
5 Sheets-Sheet 4
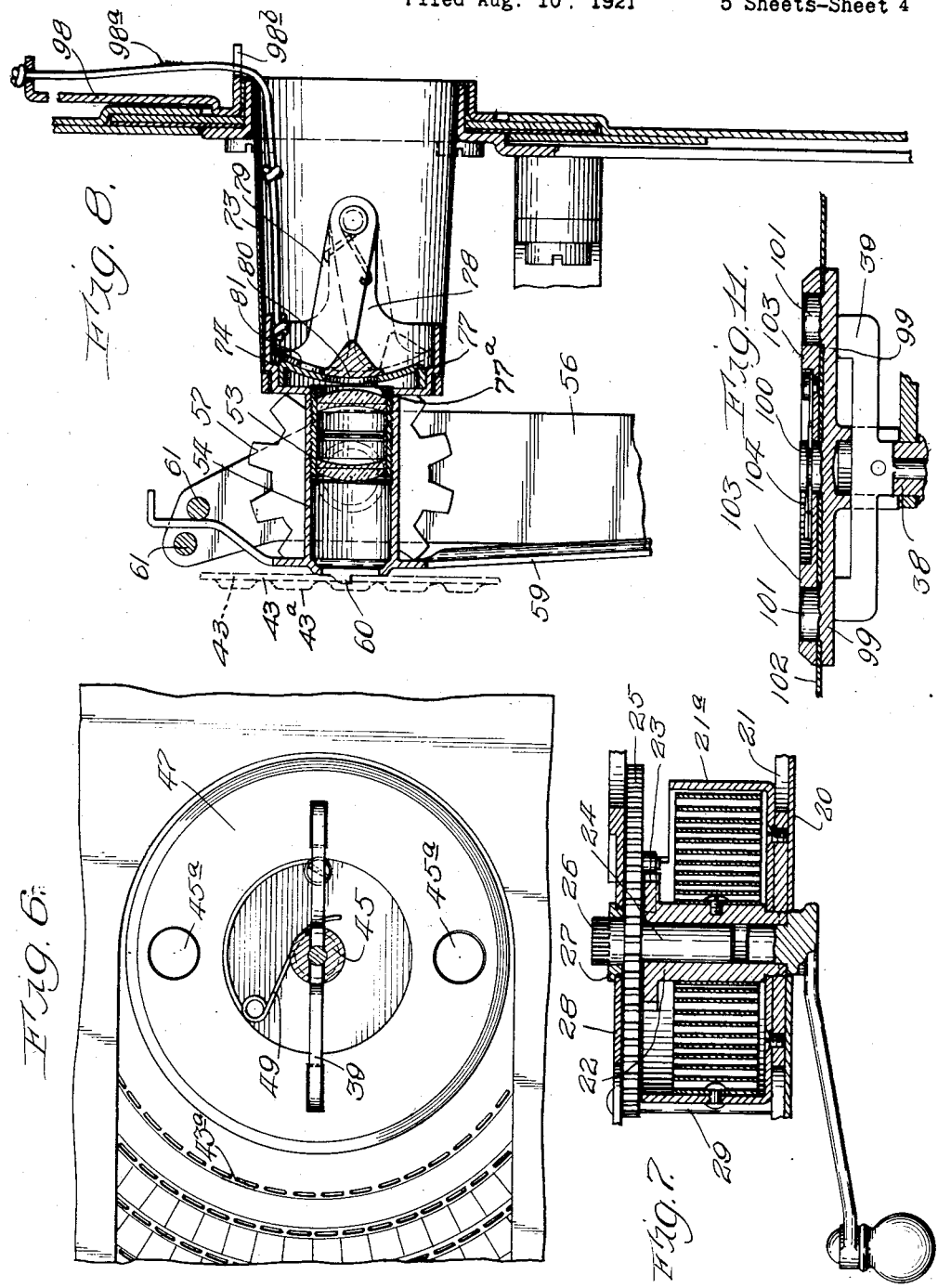
Inventor,
Henry K. Sandell,
By Dyrenforth, Lee, Chritton & Wiles,
Attys.

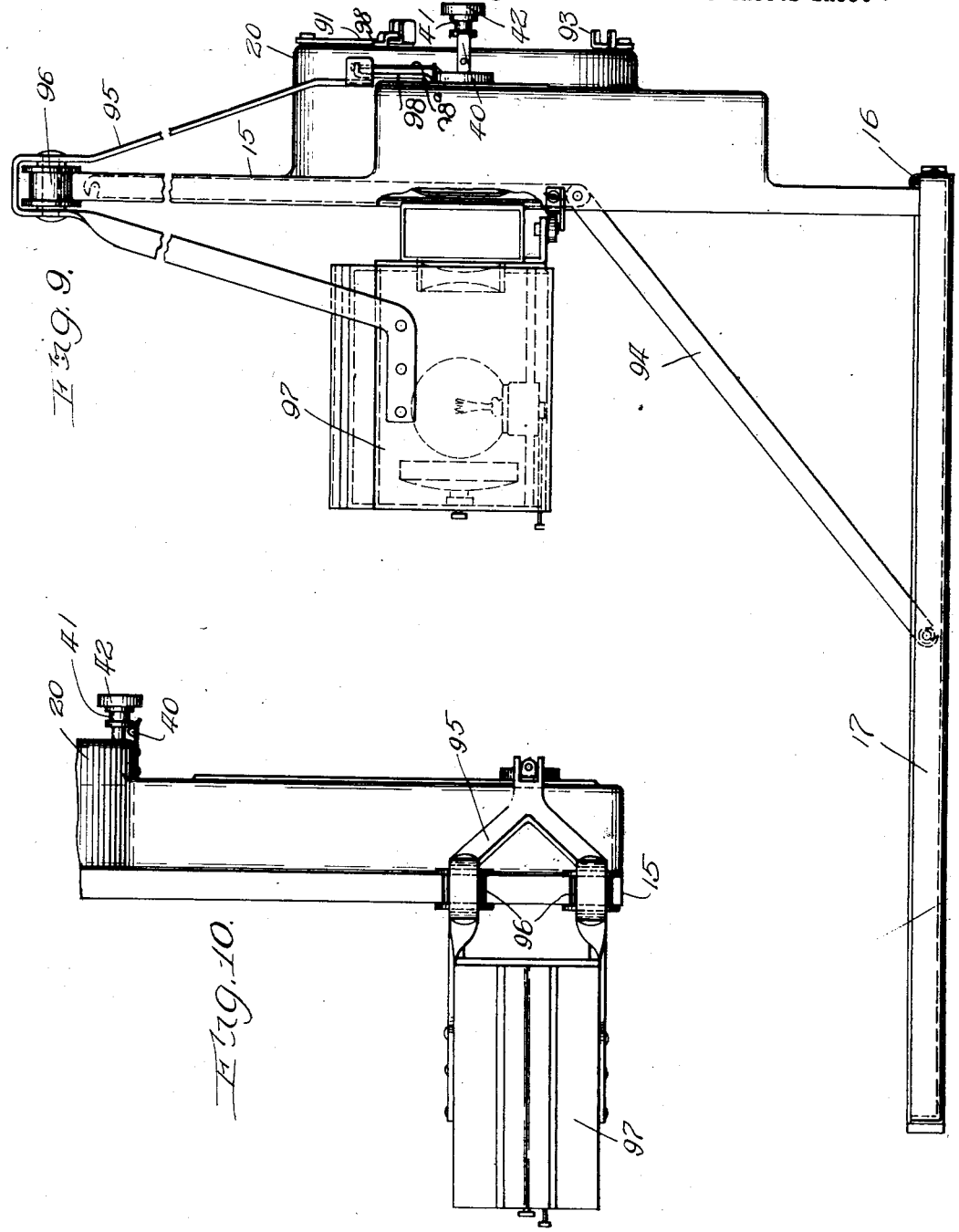

Patented May 20, 1924.

1,494,810

UNITED STATES PATENT OFFICE.

HENRY K. SANDELL, OF CHICAGO, ILLINOIS, ASSIGNOR TO HERBERT S. MILLS, OF CHICAGO, ILLINOIS.

MOTION-PICTURE CAMERA.

Application filed August 10, 1921. Serial No. 491,156.

*To all whom it may concern:*

Be it known that I, HENRY K. SANDELL, a citizen of the United States, residing at 221 South Green Street, care of Mills Novelty Co., Chicago, in the county of Cook and State of Illinois, have invented a new and useful Improvement in Motion-Picture Cameras, of which the following is a specification.

The present invention relates to improvements in motion picture apparatus and will be fully understood from the following description, illustrated by the accompanying drawings, in which:

Fig. 1 is an elevation of a motion picture camera constructed in accordance with the present invention;

Fig. 2 is an end elevation of the motion picture camera of Fig. 1;

Fig. 3 is an enlarged scale, broken sectional view on the line 3—3 of Fig. 2, looking in the direction of the arrows;

Fig. 4 is a sectional view on the line 4—4 of Fig. 3;

Fig. 5 is a sectional view on the line 5—5 of Fig. 3;

Fig. 6 is a broken sectional view on the line 6—6 of Fig. 5;

Fig. 7 is a broken sectional view on the line 7—7 of Fig. 3;

Fig. 8 is a broken vertical section on the line 8—8 of Fig. 1, showing the objective and shutter mechanism on enlarged scale;

Fig. 9 is a side elevation of the device in use as a projecting apparatus;

Fig. 10 is a broken top plan view of the device in use as a projecting apparatus; and Fig. 11 is a broken sectional view showing the mode of securing the transparency in the device when used as a projecting apparatus.

Referring more particularly to the drawings, the numeral 15 indicates a large flat box or case, of sufficient size to permit the insertion of a holder containing a disk transparency or film upon which a spiral sequence of pictures may be photographed. Such a disk transparency may suitably have engaging members arranged in a spiral and in predetermined relation to each other, so that each engaging member will bear the same relative position to one of the series of pictures to be taken upon the transparency, as more fully described in my prior Patent No. 1,381,849, dated June 14, 1921. The entire back, lower edge and sides of the casing 15 may be pivotally mounted upon hinges 16 on the lower edge of the front face of the casing 15. One edge of the casing 15 is provided with a cover 17 suitably hinged to the upper edge of the casing 15, said cover 17 being adapted to close the end of the casing and to open to permit the insertion and removal of a holder containing an unexposed disk transparency. The cover 17 may suitably be retained in closed position by a spring detent 18.

Upon the face of the box 15 is mounted a casing 20, which may suitably be a casting or of stamped metal, this casing containing the operating mechanism for the device. Secured to the top of this casing is a supporting plate 21 to which is secured the barrel 21ª of a spring motor, the hollow shaft 22 thereof being operatively connected by means of a suitable pawl and ratchet arrangement 23 to the main arbor 24, upon which is mounted the large gear 25 and the small pinion 26. The shaft 24 is suitably journalled in the hollow shaft 22 of the spring motor and in a bearing 27 screwed into a plate 28 secured to and spaced from the top of the casing 20 by pins 29. The large gear 25 engages a gear 30 which is mounted to co-operate with the shaft 31, the latter being slidable axially of the gear 30. A gear 32, preferably formed integrally with the gear 30, engages pinion 33 mounted on shaft 34, said shaft being provided with an additional pinion 35 which drives the worm of the centrifugal governor 36 mounted in lugs 36ª struck in from plate 21. This governor is provided in the usual manner with an axially slidable disk 37 controlled by the centrifugal weights.

The gears 30 and 32 mounted on the shaft 31 are preferably formed as an integral casting or member, which journals in plate 28 and is provided with a slot 38 in which the disk-driving fork 39 secured to the shaft 31 is slidably engaged. The shaft 31, together with this fork, may be pulled out by means of button 42 externally of casing 20 to disengage the disk supporting member, as hereinafter more fully described, and may be returned to a position to engage it.

In the engaging position, a detent 40 enters a groove 41 in the button 42 and retains the shaft in its proper position.

The film disk 43 to be exposed in the camera is contained in a plate holder 44, which is inserted into the camera with the end cover 17 open. A centering button 45 rotatably secures a plate or disk 46 to the back of plate holder 44 and positioning buttons 45$^a$ are eccentrically secured to the plate 46. Suitable openings in the film disk pass over the buttons 45 and 45$^a$ and the disk is retained in position by a retaining disk 47 which likewise has openings which pass over the center buttons 45 and 45$^a$. A spring detent 49 located in a central depression in the retaining plate 47 enters a groove 50 in the centering button 45 and is thereby held in position. The retaining plate 47 may be provided eccentrically with engaging members, such as slots in which the ends of the fork 39 mounted on shaft 31 may engage to cause the rotation of the plate 47 and with it the disk or film 43. The front of the plate holder 44, said front being suitably double as shown at 51, is provided with a radial slot 52 extending from its outer edge across a sufficient distance to expose the retaining plate 47 as well as the area upon which the light rays from the object to be photographed are received when the fork 39 is engaged in the slots in the retaining disk 47, the spring motor is effective to rotate the film disk, and in its rotation the entire surface of the film disk passes before the slot 52 once for each rotation of the disk.

A spiral sequence of pictures is exposed upon the film disk 43 by means of an objective or lens which travels slowly across the film as the latter is rotated. The film travels continuously and the objective is caused to travel with the film for the period of each exposure. This is suitably effected by the co-operation of the engaging members or projections 43$^a$ in the spiral groove of film 43, more fully described in my prior patent above referred to, which co-operated with suitable engaging means operatively connected to the objective or objective support.

Referring more particularly to the drawings, the objective 53 is mounted in a cylindrical casing or cell 54 which is carried by a pivoted arm 56, in the following manner. The pivoted arm 56 has secured to it a roller 57 which engages in the spiral groove in the disk or film 43, and its spacing from the film is thereby determined. A link 58 is pivotally mounted at one end on the arm 56 and to the other end of the link 58 is pivotally secured the bent arm 59 on which is mounted the cell or casing 54 containing the objective 53. The arm 59 is likewise provided with a pawl-like finger 60 which when properly positioned is engaged by the projections 43$^a$ in the spiral groove of the film 43, the objective opening being thus positioned over the film between the grooves. The adjacent end of the arm 59 is bent upwardly and passes between two pins 61, 61 mounted on arm 56, its position and movement being thereby in part determined. The other end of the arm 59 beyond the point at which it is pivoted to the link 58 is forced outwardly by means of the spring 62, one end of which is secured to the arm 59 and the other end to the lug 63 formed on the arm 56.

The arm 56 is pivotally mounted upon a standard 64. To this standard is rigidly secured a short arm 65 and coil spring 66 between the end of this arm and the lug 63 forces the arm 56 with the attached devices inwardly toward the film. The standard 64 is mounted upon a supporting bar 67 which in turn is rigidly secured at its end 68 to a steel curtain 69, the ends of which are secured to rollers 70 at opposite ends of a slot formed in the face of the casing 20. This slot corresponds in position to the slot 52 in the plate holder. The curtain 69 slides in grooves formed between the face of the casing 20 and a plate 71 secured to the underside thereof, a light proof covering for the slot being thereby formed by the curtain. The rollers 70 upon which the ends of the curtain are mounted are protected by suitable hoods 72. The curtain 69 is provided with an opening opposite the lens 53 and a bellows 73 extends from the opening in the curtain to the enlarged end 74 of the cell 54 in which the lens is mounted. This bellows 73 prevents leakage of light, as will be readily apparent, and permits movement of the lens cell relative to the aperture in the curtain 69.

As the film or disk rotates, the lens follows the spiral groove, being held in proper relation to the area to be exposed by the roller 57 mounted on the arm 56. The pawl 60 on the lens carrying arm 59 is successively engaged by the projecting members 43$^a$ formed in the spiral groove on the disk. These engaging members cause the arm 59 with the lens to move with the disk for a short space of time, during which exposure takes place. The pawl 60 is disengaged at the end of the forward movement of the lens by an outward movement of the arm 59 resulting from the curved end of that arm riding upon one of the pins 61 shown in Fig. 8. The link 58 permits the action just described, and also is so arranged that in this movement the lens is also moved slightly toward the film and tilted or inclined backward to compensate for the forward movement of the film and lens. When the pawl 60 is freed from engagement with the indentation in the disk, the lens-cell is retracted to its normal position by the spring 62. At the end of the return movement, the pawl 60 engages a fresh indentation, causing the lens-cell to come to a sudden stop, while the momentum of the shutter, which will be described presently, causes it to open to permit the exposure to be made, whereupon the shutter is again closed by its spring. It should be borne in mind, however, that the disk continues its rotation while the retraction of the lens-cell takes place and the lens-cell then moves forward again with the disk while the exposure occurs. In due time, however, the shutter-spring recovers and closes the shutter, which will now be described. In the enlarged end 74 of the cell 54 for the lens there is secured a cover member 77 having a cylindrical curvature, this cover member being provided with a suitable opening 77$^a$ directly above the lens. The enlarged end 74 of the cell is likewise formed with a projecting tongue 78 to which is pivotally secured an arm 79 carrying a weighted shutter 80 provided with an opening 81. A spring coiled around the pivot supporting the arm 79 engages the tongue 78 and the shutter 79 to hold the latter in position such that the opening 81 is completely out of alignment with the opening 78. The vibration of the cell 54 causes a vibration of the shutter, due to its inertia, resulting in the alignment of the openings 81 and 77$^a$ during a part of the period when the lens is moving with the film.

In order to draw the objective out of engaging position when removing or inserting a film, a cord 98$^a$ is secured to the enlarged end 74 of the casing, passing through a slot in a fork 98$^b$ and an opening in the outwardly turned end of a projecting tongue 98, being secured by a knot. The lens cell may be drawn outwardly by this cord and secured by engagement of a knot on the cord with fork 98$^b$.

As the film is rotated, in order to cause the roller 57 mounted on the arm 56 and the lens 53 to follow a spiral path, the curtain 69 and the bar 67 secured thereto for supporting the lens carrying mechanism are moved radially of the film. In order to accomplish this, a link 75 is pivotally secured at one end to the supporting bar 67 and is provided on one side with a rack-face 76 which engages the pinion 27 mounted on the spring motor shaft 24. This rack and pinion are so proportioned that each rotation of the disk causes the necessary inward movement of the lens carrying mechanism.

In using the device with a continuously moving film, it is preferred to have the exposures evenly spaced in the spirals upon the film and for this purpose means are provided for varying the angular speed of movement of the disk in order to maintain a constant linear speed of the film rotating under the lens. In order to accomplish this, the back of the rack 75 is formed with a cam surface 81$^a$, which engages the curved end of an arm 82 pivoted on pin 83 secured to plate 28, the arm 82 being normally held in engagement with the rack 81 by the spring 84. A pin 85 contacts with a cam surface formed on one end of lever 86, this lever being pivoted at 87 to the plate 28. At its other end this lever is provided with a fiber friction member 88. As the rack 75 is moved to bring the lens toward the center of the film, its cam surface 81$^a$ acts upon the end of arm 82 causing the pin 85 to move the end of lever 86 in such manner that the friction member 88 moves forwardly against the governor disk 37 and increases the angular speed of the film, thereby maintaining the linear velocity at the point of exposure substantially constant. In order to stop the motor entirely a friction member 89 is mounted upon an arm secured to a shaft 90 extending through the top of the case and provided externally with an operating lever 91. In order to release the rack 76 from the pinion 26 when it is desired to move the lens freely backward or forward, a bent lever 92 is provided which engages an end of the arm 82 and forces it out of contact with the back of the rack, thereby permitting the latter to fall away from the pinion 36. The lens and its supporting members may thereupon be freely moved. The arm 92 may be operated from without the casing by the lever arm 93.

In case it is desired to use the device for projecting purposes, the back 17 is opened and the front 15 with the casing containing the drive and operating mechanism is held upright by the link 94. A yoke 95 is then placed over the top of the box 15 of the camera, being provided with two grooved rollers 96 which ride upon the top of the box. In the rear of the box the yoke supports a casing 97 containing suitable illuminating devices and projecting lenses, and in front of the box the yoke engages projecting lug 98 as shown in Fig. 9. The disk to be projected is retained in position by the means shown in Fig. 11. A plate member 99 is provided which has a central boss adapted to slide over the end of the shaft 38 and slotted so as to engage the arms of the driving fork 39. On its opposite side this plate is provided with a projecting grooved button 100, and with positioning buttons 101. The disk 102 is then placed upon the plate 99, the button 100 and 101 entering corresponding openings in the disk. The retaining plate 103 is then placed upon the disk, it likewise being provided with apertures corresponding to the buttons 100 and 101. A spring detent 104 in the retaining plate 103 enters the groove in the button 101 and thereby locks the assembly. The assembly is retained in position on the drive shaft by the juxtaposition of the projecting member 97. The spring motor then operates to move the projecting mechanism with the lens transversely across the film during the rotation of the latter.

Although the present invention has been described in connection with the specific details of an embodiment thereof it is not intended that these details shall be regarded as limitations upon the scope of the invention, except in so far as included in the accompanying claims.

I claim:

1. In a moving picture machine, a rotatable film support, a rotatable shaft provided with means for engaging said film support, a movable lens support, drive means for rotating said rotatable shaft, means for moving the lens support radially with respect to the film support, and governor means controlled by the movement of the lens-supporting means to vary the rate of movement imparted by said drive means.

2. In a moving picture machine, a rotatable film support, a rotatable shaft having means for engaging said film support, a drive shaft for rotating said rotatable shaft, a lens support, means operable from the drive shaft for moving the lens support radially with respect to the film support, and governor means controlled by the movement of the lens-supporting means to vary the rate of movement of the drive shaft imparted by said drive means.

3. In a moving picture machine, a rotatable film support, a rotatable shaft provided with means for engaging said film support, a drive shaft for rotating said rotatable shaft, a lens support, a rack member operable from the drive shaft and secured to the lens support for moving the latter radially of the film support, and governor means controlled by said rack member to vary the rate of movement of the drive shaft.

4. In a moving picture machine, a rotatable film support, a rotatable shaft provided with means for engaging said film support, a drive shaft for rotating said rotatable shaft, a lens support, a rack member operable from the drive shaft, a cam cooperating with said rack member, and means operated by said cam to control the drive shaft to increase the angular velocity of said film support as the lens support approaches its center.

5. In a moving picture machine, a rotatable film support, a rotatable shaft provided with means for engaging said film support, a drive shaft for rotating said rotatable shaft, a lens support, a rack member operable from the drive shaft, said rack member being formed with a cam back, a lever operated by said cam back and governor mechanism for said drive shaft operated by said lever to increase the angular velocity of said film support as the lens support approaches its center.

6. In a moving picture machine, a rotatable film support, a rotatable shaft provided with means for engaging said film support, a drive shaft for operating said rotatable shaft, a lens support, a rack member engaging the drive shaft and operable therefrom, said rack member being attached to the said lens support for moving the latter radially of the film support, and means holding the rack member in engagement with the drive shaft, said means being releasable from the drive shaft whereby the lens support may be freely moved relative to the drive shaft on release of said engaging means.

7. In a moving picture machine, a rotatable film support, a rotatable shaft provided with means for engaging said film support, a drive shaft for operating said rotatable shaft, a lens support, a rack member engaging the drive shaft and operable therefrom, said rack member being attached to the said lens support for moving the latter radially of the film support, means holding the rack member in engagement with the drive shaft whereby the lens support may be freely moved relative to the drive shaft on release of said engaging means, and governor means controlled by said rack member to vary the rate of movement of the drive shaft.

8. In a moving picture machine, a rotatable film suport, a rotatable shaft provided with means for engaging said film support, a drive shaft for rotating said rotatable shaft, a lens support, a rack member engaging the drive shaft and secured to the lens support for moving the latter radially of the film support, said rack member being formed with a cam back, a lever, means for yieldingly holding the lever in engagement with the cam back, governor mechanism for said drive shaft operated by said lever to increase the angular velocity of said film support as the lens support approaches its center, and means for disengaging the lever from the cam back of the rack, whereby the latter may be disengaged from the drive shaft.

9. In a moving picture machine, in combination, a casing, a disk film within the casing, means for rotating the film, a lens cell within the casing, means for moving the lens cell across the face of the film, a curtain in the casing before the lens and movable therewith, said curtain being provided with an aperture, and a bellows between the lens cell and the aperture.

10. In a moving picture machine, in combination, a casing, a disk film within the casing, means for rotating the film, a lens cell within the casing, a curtain in the casing before the lens cell; said curtain being provided with an aperture, a supporting bar rigidly secured to said curtain, means for supporting the lens cell mounted upon said bar, a bellows between the lens cell and the aperture of the curtain and means secured to the supporting bar for moving the lens cell and the curtain together across the face of the film.

11. In a moving picture machine, in combination, a casing, a disk film within the casing, means for rotating the film, a lens cell within the casing, means for moving the lens cell across the face of the film, means for moving the lens cell a limited distance with the film, a curtain in the casing before the lens and movable therewith, said curtain being provided with an aperture, and a bellows between the lens cell and the aperture.

12. In a moving picture machine, in combination, a casing, a disk film within the casing, means for rotating the film, a lens cell within the casing, a curtain in the casing before the lens cell, said curtain being provided with an aperture, a supporting bar rigidly secured to said curtain, means for supporting the lens cell mounted on said bar, means for moving the lens cell a limited distance with the film relative to said bar, a bellows between the lens cell and the aperture of the curtain, and means secured to the supporting bar for moving the lens cell and the curtain together across the face of the film.

13. In a moving picture machine, in combination, a casing, a disk film within the casing, said film being provided with regularly disposed engaging members, means for continuously rotating the film, a lens cell within the casing, a curtain in the casing before the lens cell, said curtain being provided with an aperture, a supporting bar rigidly secured to said curtain, means for movably supporting the lens cell mounted upon said bar, engaging means provided upon said supporting means and cooperating with the engaging means upon the film whereby the lens cell is moved for a limited distance with the film, a bellows between the lens cell and the aperture of the curtain, and means secured to the supporting bar for moving the lens cell and the curtain together across the face of the film.

14. In a moving picture machine, a rotatable film support, a film mounted thereon and provided with regularly disposed engaging means, a rotatable shaft provided with means for engaging said film support, a movable supporting bar, a reciprocable lens support mounted thereon and provided with means for engaging the engaging means upon the film, thereby moving the lens support relative to the supporting bar, drive means for rotating said rotatable shaft, means for moving said supporting bar radially with respect to the film support, and governor means controlled by the movement of the lens supporting means to vary the rate of movement imparted from said drive means to the film support.

15. In a moving picture machine, a rotatable film support, a film mounted thereon and having regularly disposed engaging means, a rotatable shaft provided with means for engaging said film support to effect its rotation, a movable supporting bar, a reciprocable lens support mounted thereon and provided with means for engaging the engaging means on the film to move the lens support relative to said supporting bar, a drive shaft for rotating the said rotatable shaft, a rack member operable from the drive shaft and secured to the lens support for moving the latter radially of the film support, and governor means controlled by said rack member to vary the rate of movement of the drive shaft.

16. In a moving picture machine, a rotatable film support, a film mounted thereon and having regularly disposed engaging means, a rotatable shaft provided with means for engaging said film support to effect its rotation, a movable supporting bar, a reciprocable lens support mounted thereon and provided with means for engaging the engaging means on the film to move the lens support relative to said supporting bar, a drive shaft for rotating the said rotatable shaft, a rack member operable from the drive shaft and secured to said supporting bar for moving the latter radially of the film support, a cam cooperating with said rack member, and means operated by said cam to control the drive shaft to increase the angular velocity of said film support as the lens support approaches its center.

17. In a moving picture machine, a rotatable film support, a film mounted thereon and having regularly disposed engaging means, a rotatable shaft provided with means for engaging said film support to effect its rotation, a movable supporting bar, a reciprocable lens support mounted thereon and provided with means for engaging the engaging means on the film to move the lens support relative to said supporting bar, a drive shaft for rotating the said rotatable shaft, a rack member operable from the drive shaft and secured to said supporting bar for moving the latter radially of the film support, the rack member being formed with a cam back, a lever operated by said cam back, and governor mechanism for said drive shaft operated by said lever to increase the angular velocity of said film support as the lens support approaches its center.

18. In a moving picture machine, a casing having a flat box portion, a removable film container therein, a rotatable film support mounted in said container, an opening being provided in said container in its front exposing the film support and extending across the container, a lens support in the casing movable in front of the container along the opening therein, and means within the casing for rotating the film support and for effecting movement of the lens support.

19. In a moving picture machine, a casing having a flat box portion, a removable film container mounted therein, a rotatable film support mounted in said container, the container being provided with an opening in front of said film exposing the film support and extending across the container, the casing being provided with an opening in front of the opening in the film container, a movable curtain for the casing opening, said curtain being provided with an aperture, a lens support secured to said curtain, means within the casing for rotating the film support, and means within the casing for moving the curtain and the lens support together before the opening in the film container.

20. In a moving picture machine, in combination, a casing, a disk film within the casing, means for rotating the film, a lens cell within the casing, means for engaging the lens cell with the film whereby movement of the latter causes movement of the former with the film for a predetermined distance, a curtain in the casing before the lens cell and movable therewith, said curtain being provided with an aperture, a bellows between the lens cell and the aperture, and means for disengaging the lens cell from the film.

21. In a moving picture machine, in combination, a casing, a disk film within the casing, means for rotating the film, a lens cell within the casing, means for engaging the lens cell with the film whereby movement of the latter causes movement of the former with the film for a predetermined distance, a curtain in the casing before the lens cell and movable therewith, said curtain being provided with an aperture, a bellows between the lens cell and the aperture, means for disengaging the lens cell from the film, and means for holding said disengaging means in position after the lens cell has been disengaged from the film.

22. In a moving picture machine, in combination, a casing, a disk film within the casing, means for rotating the film, a lens cell within the casing, means for engaging the lens cell with the film whereby movement of the latter causes movement of the former with the film for a predetermined distance, a curtain in the casing before the lens cell and movable therewith, said curtain being provided with an aperture, a bellows between the lens cell and the aperture, a cord connected to the lens cell and extending through the aperture for disengaging the lens cell from the film and a clutch member mounted on the curtain for holding the cord in disengaging position.

23. In a moving picture machine, in combination, a casing having a rotatable film support, a disk film mounted thereon, an apertured curtain movable before said film, a lens cell movable with said curtain and opening through the aperture, a supporting member movably mounted on said casing, means for engaging said supporting member with the curtain whereby movement of the latter is imparted to the former, and projecting means supported by the supporting member back of the film in alignment with the lens cell and the curtain aperture.

24. In a moving picture machine, in combination, a casing having a rotatable film support, a disk film mounted thereon, an apertured curtain movable before said film, a lens cell movable with said curtain and opening through the aperture, a yoke straddling the casing and movable thereon, a lug secured to the curtain and engaging one arm of the yoke whereby movement of the curtain is imparted thereto and projecting means supported by the back of the film in alignment with the lens cell and the curtain aperture.

25. In a moving picture machine, in combination, a casing, a disk film within the casing, means for rotating the film, a lens cell within the casing, means for moving the lens cell across the face of the film, a curtain in the casing before the lens and movable therewith, said curtain being provided with an aperture, and a bellows between the lens cell and the aperture.

26. In a moving picture machine, in combination, a casing, a disk film within the casing, means for rotating the film, a lens cell within the casing, means for moving the lens cell across the face of the film, means for moving the lens cell a limited distance with the film, a curtain in the casing before the lens and movable therewith, said curtain being provided with an aperture, and a bellows between the lens cell and the aperture.

27. In a moving picture machine, in combination, a casing, a disk film within the casing, means for rotating the film, a lens cell within the casing, means for engaging the lens cell with the film whereby movement of the latter causes movement of the former with the film for a predetermined distance, a curtain in the casing before the lens cell and movable therewith, said curtain being provided with an aperture, a bellows between the lens cell and the aperture, and means for disengaging the lens cell from the film.

28. In a moving picture machine, in combination, a casing, a disk film within the casing, means for rotating the film, a lens cell within the casing, means for engaging the lens cell with the film whereby movement of the latter causes movement of the former with the film for a predetermined distance, a curtain in the casing before the lens cell and movable therewith, said curtain being provided with an aperture, a bellows between the lens cell and the aperture, means for disengaging the lens cell from the film, and means for holding said disengaging means in position after the lens cell has been disengaged from the film.

29. In a moving picture machine, in combination, a casing, a disk film within the casing, means for rotating the film, a lens cell within the casing, means for engaging the lens cell with the film whereby movement of the latter causes movement of the former with the film for a predetermined distance, a curtain in the casing before the lens cell and movable therewith, said curtain being provided with an aperture, a bellows between the lens cell and the aperture, a cord connected to the lens cell and extending through the aperture for disengaging the lens cell from the film and a clutch member mounted on the curtain for holding the cord in disengaging position.

HENRY K. SANDELL.